United States Patent [19]

Desmond et al.

[11] Patent Number: 4,628,077
[45] Date of Patent: Dec. 9, 1986

[54] PREPARATION OF POLYAMIDE WITH CATALYST COMPRISING TRANSITION METAL ATTACHED TO A LIGAND WHICH CONTAINS ELECTRON WITHDRAWING GROUPS

[75] Inventors: Michael J. Desmond, Cleveland Heights; Raymond J. Weinert, Jr., Garfield Hts.; Lawrence E. Ball, Akron; Kenneth C. Benton, Macedonia, all of Ohio

[73] Assignee: The Standard Oil Company, Cleveland, Ohio

[21] Appl. No.: 794,584

[22] Filed: Nov. 1, 1985

Related U.S. Application Data

[63] Continuation of Ser. No. 562,270, Dec. 16, 1983, abandoned.

[51] Int. Cl.$^4$ .............................................. C08G 69/00
[52] U.S. Cl. ...................................... 526/90; 526/135; 526/147; 526/172; 526/311; 526/317.1; 528/271; 528/310; 528/319; 528/323; 528/336; 528/363
[58] Field of Search ............... 528/319, 363, 271, 310, 528/323, 336; 526/311, 317, 135, 147, 90, 172

[56] References Cited

U.S. PATENT DOCUMENTS 4,283,524  8/1981  Greene ................................. 528/363
4,459,394  7/1984  Coffey et al. ........................ 528/319

Primary Examiner—Harold D. Anderson
Attorney, Agent, or Firm—David P. Yusko; John E. Miller; Larry W. Evans

[57] ABSTRACT

A novel transition metal complex catalyst comprised of a transition metal attached to a ligand containing electron withdrawing substituents is employed in a polymerization process for producing nylon type polyamides.

25 Claims, No Drawings

PREPARATION OF POLYAMIDE WITH CATALYST COMPRISING TRANSITION METAL ATTACHED TO A LIGAND WHICH CONTAINS ELECTRON WITHDRAWING GROUPS

REFERENCE TO RELATED APPLICATIONS

This is a continuation of application Ser. No. 562,270, filed Dec. 16, 1983, now abandoned.

BACKGROUND OF THE INVENTION

1. Field of the Invention

This invention relates to a catalytic process for the preparation of polyamides. More specifically this invention relates to a novel catalyst consisting of at least one transition metal attached to at least one ligand containing electron withdrawing substituents. In one embodiment, these electron deficient catalysts are useful for the production of nylon-3 and nylon-3,X polymers and copolymers of increased molecular weight.

2. Description of the Prior Art

Polyamides are polymers which contain recurring amide groups (CONH) as integral parts of the main polymer chain. Polyamides are generally formed by condensation polymerization or by addition polymerization. The parameters for these processes as well as the specific monomers suitable for polyamide formation are known to those skilled in the art.

Polyamides are frequently referred to as nylons. A common form of shorthand, which serves to identify aliphatic polyamides, involves the use of numbers that signify the number of carbon atoms in the respective monomers which were polymerized to form the polyamide. For Example, nylon-6 results from the polymerization of caprolactam and nylon-6,6 is formed by the polymerization of hexamethylenediamine and adipic acid.

In part, the instant invention pertains to the production of nylon-3 and nylon-3,X polymers and copolymers. It is known that nylon-3 can be prepared from various monomers. For example, U.S. Pat. No. 4,283,524 describes a process where nylon-3 is prepared from the ammonium salts of alpha,beta-unsaturated monocarboxylic acids. U.S. Pat. No. 2,691,643 teaches that nylon-3 can be prepared by the thermal condensation of beta-amino propionic acid. U.S. Pat. Nos. 3,629,203 and 3,499,879 relate to the preparation of nylon-3 by the condensation reaction of acrylonitrile. U.S. Pat. No. 2,749,331 teaches that nylon-3 can be prepared from acrylamide. However, nylon-3 polymers and copolymers produced by these processes are generally characterized by very low molecular weight.

An object of the instant invention is a catalytic process useful for preparation of polyamides.

A further object of the instant invention is a catalytic process useful for producing nylon-3 polymers and copolymers of increased molecular weight.

SUMMARY OF THE INVENTION

In a process for producing a nylon type polyamide, containing a plurality of

  (I)

amide groups as integral parts of the main polymer chain, polyamide forming reactants are contacted at a temperature sufficient to cause polymerization with a novel transition metal complex catalyst. The catalyst comprises at least one transition metal attached to a ligand containing electron withdrawing substituents.

DETAILED DESCRIPTION OF THE INVENTION

The Polymer

The preferred polyamides obtained by the process of this invention are characterized as containing ethylene amido group in the polymer backbone. These ethylene amido groups are generally defined as having repeating units as follows:

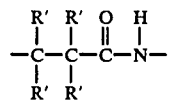  (II)

wherein each R' is hydrogen, an alkyl radical having from 1 to 4 carbon atoms or a halogen. These ethylene amido linkages comprise the basic structure of a nylon-3 type polyamide.

Polyamides wholly or partially comprised of other carbonamide structural units may also be obtained by the process of the instant invention. These carbonamide structural units will vary depending on the particular monomer or monomers used in the polymerization. For example, the carbonamide unit may comprise a nylon-6 type unit which has the following formula:

wherein R' is as previously defined. Other carbonamide units such as nylon-4 precursors, nylon-11 precursors, nylon-6,6 precursors, nylon-6,10 precursors, nylon-7 precursors, nylon-8 precursors and nylon-12 precursors may be contained in the polyamide of this invention. The properties of the resultant polyamide will depend on the type of monomer or monomers used and the ratio of the various monomers.

While this invention is directed principally to polyamides, it also includes within its ambit polyamides containing polymer chains formed from the above units together with other units which may be introduced into the chain, for example, by adding suitable copolymerizable monomers to the polymerization mixture.

The polyamides obtained by the process of this invention have a wide variety of applications. Generally, they may be used in any application calling for a nylon type polymer. For example, these polyamides can be used as fibers, plastics, films and molding resins.

Polyamide Forming Reactants

Polyamide forming reactants suitable for polymerization with the catalytic process of this invention include (1) alpha,beta-unsaturated carboxylic acids and ammonia, (2) ammonium salts of alpha,beta-unsaturated carboxylic acids, (3) amides of alpha,beta-unsaturated carboxylic acids, (4) alpha,beta-olefinically unsaturated nitriles and water, (5) omega-amino acids, (6) cyclic lactams and (7) combinations of any of these. The catalyst is also suitable for polymerizing alpha, omega-dinitriles with alpha,omega-diamines to form a polyamide and for polymerizing lactones with a polyamide precursor to form a polyamide ester.

The alpha,beta-unsaturated carboxylic acids suitable for polymerization when contacted with ammonia are of the structure

where R' is hydrogen, a lower alkyl group having from 1 to 4 carbon atoms or a halogen and R" is hydrogen or an alkyl group having from 1 to 10 carbon atoms. Such compounds include propenoic acid and crotonic acid, with propenoic, i.e. acrylic acid, preferred.

The ammonium salts of alpha,beta-unsaturated carboxylic acids suitable for this invention are of the formula:

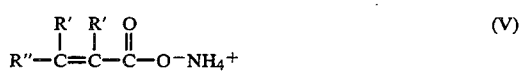

where R' and R" are as defined in the preceding paragraph. The ammonium salts of this invention typically result from the reaction of an alpha-beta-unsaturated carboxylic acid and ammonia. Preferred ammonium salts contain between 3 and 7 carbon atoms. Most preferred are ammonium acrylate and ammonium methacrylate.

The amides of alpha,beta-unsaturated carboxylic acids suitable for polymerization are of the following formula:

where R' and R" are as previously defined. Preferred amides contain between 3 and 7 carbon atoms. Most preferred amides are acrylamide and methacrylamide.

The unsaturated nitriles suitable for polymerization when contacted with water are the alpha,beta-olefinically unsaturated mononitriles having the structure:

wherein R' is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred monounsaturated nitriles are acrylonitrile and methacrylonitrile.

The amino acids most useful in the present invention are the omega-amino acids having the structure

where R' is as previously defined and R''' is a divalent alkyl radical having between 1 and 10 carbon atoms. Such compounds include beta-alanine, alpha-methyl-beta-alanine and epsilonaminocaproic acid.

The cyclic lactams most useful in the present invention contain between 3 and 8 carbon atoms. Preferred lactams are caprolactam, pyrrolidone and other commercially available lactams. Other lactams of use in this invention may be synthesized by one skilled in the art.

The diamines most useful in the present invention are alpha, omega-diamines of the formula:

where $R^{IV}$ is a divalent organic radical and each $R^V$ is independently hydrogen or a univalent organic radical. $R^{IV}$ may be an aliphatic, alicyclic or an aromatic radical or a substituted derivative thereof. $R^V$ may be a hydrogen or an aliphatic, an alicyclic or an aromatic radical or a substituted derivative thereof. If substituted, the substituents are inert under the reaction conditions. Preferably $R^{IV}$ is a $C_2$–$C_{20}$ aliphatic radical, a $C_5$–$C_7$ alicyclic radical, an aryl radical or an inertly substituted derivative of any one of these. Preferably $R^V$ is hydrogen, a $C_1$–$C_{20}$ aliphatic radical, a $C_5$–$C_7$ alicyclic radical, a phenyl radical or an inertly substituted derivative of any one of these. Preferred diamines are aliphatic or aromatic diamines which contain from 4 through 12 carbon atoms such as tetramethylenediamine, hexamethylenediamine, p-diaminodicyclohexylmethane, 4,4' diaminodicyclohexylether, 4,4' diaminodicyclohexylsulfide, octamethylenediamine, decamethylenediamine, dodecamethylenediamine and the like, i.e. wherein $R^{IV}$ is an alkylene or arylene divalent radical of 4 to 12 carbon atoms and $R^V$ is hydrogen.

The dinitriles most useful in the present invention are alpha, omega-dinitriles of the formula:

where $R^{IV}$ is as defined in the preceding paragraph. Preferred dinitriles are aliphatic or aromatic dinitriles which contain from 4 through 12 carbon atoms, such as, glutaronitrile, succinonitrile, adiponitrile, suberonitrile, sebaconitrile, 1,10-decane dinitrile, methyl glutaronitrile terephthalonitrile and the like; i.e. wherein $R^{IV}$ is an alkylene or arylene divalent radical of 2 to 10 carbon atoms. The diamines and dinitriles preferred for this invention are commercially available.

The catalysts and process of the instant invention is also useful for preparing polyamide esters by the polymerization of lactones with a suitable polyamide precursor. Lactones of use in the present invention to form a polyamide ester contain between 3 and 8 carbon atoms. Preferred lactones are propiolactone, caprolactone and other commercially available lactones. Other lactones may be synthesized by one skilled in the art. Suitable polyamide precursors include, the ammonium salts of an alpha,beta-unsaturated carboxylic acid, omega-amino acids, alpha,beta-unsaturated mononitriles and the like. These polyamide precursors are as previously described. Preferred polyamide precursors for copolymerization with a lactone to form a polyamide ester are ammonium acrylate, acrylonitrile, beta-alanine and the like.

The Catalysts

The catalysts employed in the instant invention are transition metal complexes. These transition metal complexes are coordination compounds; i.e. a compound formed by the union of a metal ion (usually a transition metal) with at least one nonmetallic ion or molecule called a ligand. The bonding between the metal ion and ligand is neither covalent nor electrostatic, but may be considered an intermediate between the two types. The ligands employed in the instant invention are further characterized as containing electron withdrawing substituents.

While not wishing to be bound by theory it is believed that the transition metal is the catalytic portion of the catalyst. It is also theorized that the transition metal has a greater catalytic effect when the electron concentration surrounding the transition metal nucleus for a series of complexes is decreased. It is believed that the electron withdrawing substituents on the ligand serve to increase the electron density at the union between the transition metal and the ligand and/or on the ligand itself, thereby decreasing the electron density for the remaining portion of the transition metal and thereby providing a better polyamide catalyst than a corresponding complex with unsubstituted ligands.

The transition metals of use for the catalyst of the instant invention are those elements in Groups 1b through 7b and Group 8 of the Periodic Table of Elements. The Periodic Table referred to herein is that appearing in the *Handbook of Chemistry and Physics*, 61st ed., Chemical Rubber Co. (1980). Preferred transition metals are cobalt, molybdenum, nickel, copper, iron, manganese, ruthenium, chromium, vanadium and rhodium. Most preferred transition metals are cobalt, molybdenum, nickel and copper. Valence states for the transition metal of +2 or greater are preferred, and valence states greater than +2 are more preferred.

The ligands of use for the catalyst of the instant invention are non-metallic ions or molecules. Typically these ligands are organic in nature and have a net negative or neutral charge. Organic ligands that include oxygen, nitrogen, sulfur, phosphorus, arsenic or mixtures of these are preferred. Representative of suitable ligands of use in the instant invention are

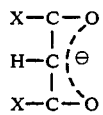 (XI)

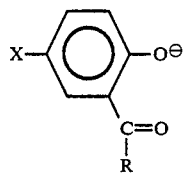 (XII)

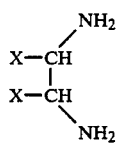 (XIII)

where X is an electron withdrawing substituent and where R is an alkyl or aryl radical. Representative of suitable electron withdrawing substituents are —F, —Cl, —Br, —I, —CF$_3$,

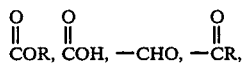

—CN, —NH$_3{}^+$, —NO$_2$ and —NR$_3{}^{30}$ where R is an alkyl or aryl radical. Suitable electron withdrawing substituents are characterized by a positive Hammett coefficient or substituent constant as determined by the Hammett equation.

The Hammett equation (named for Louis P. Hammett of Columbia University) is a linear free energy relationship for related compounds revealing that a linear relationship exists between the free energy change and the effect exerted by a substituent, and is as follows:

$$\log \frac{K}{K_o} = \rho\sigma$$

where

K is the equilibrium constant for the substituted case, $K_o$ is the equilibrium constant for the unsubstituted case, ρ(rho) is the reaction constant for a given reaction and set of constant conditions (temperature, pressure, time, etc.), and σ(sigma) is the Hammett coefficient or substituent constant indicating the relative electron-withdrawing or electron releasing effect of a particular substituent.

The Hammett coefficient is a function of the substituent and has often been found to be independent of the particular reaction involved. Substituents which have an effect on the reaction associated with electron withdrawing activity have positive Hammett coefficients, while those which are electron donating have negative coefficients. While the Hammett equation has been most often used to describe reactions of organic molecules, the Hammett coefficients are useful in describing the relative electron donating/withdrawing effects of substituents which are present on the ligands of transition metal complexes. Tables of Hammett coefficients and a more complete discussion of the Hammett equation are found in *Advanced Organic Chemistry: Reactions, Mechanisms and Structure*, J. March, McGraw Hill Book Company, 1968.

The catalysts suitable for the instant invention are typically prepared by subsequent displacement reactions in solution, but some catalysts are commercially available. Cobalt (II) acetylacetonate (also known as cobalt (II) 2,4pentanedionate) and cobalt (III) acetylacetonate (also known as cobalt (III) 2,4- pentanedionate) are available from Alpha Products, Division of Morton-Thiokol Inc. Cobalt (II) hexafluoroacetylacetonate and suitable ligands such as hexafluoracetylacetone and trifluoracetylaceton are available from PCR Research Chemicals, Inc.

The Cocatalyst

In one embodiment of this invention, the catalyst is employed with an optional cocatalyst. The cocatalyst is an organometallic compound containing at least one element of Group 1a, Group 2a and Group 3a. An organometallic compound is comprised of a metal attached directly to a carbon atom. The elements of Group 1a, Group 2a and Group 3a of the Periodic Table suitable for use in the cocatalyst are lithium, sodium, potassium, cesium, beryllium, magnesium, calcium, strontium, boron, aluminum, gallium and indium. Preferred cocatalysts are di-sec-butylmagnesium, n-butylmagnesium chloride, aluminum triethyl and compounds of the formula:

 (XIV)

where $R^{VI}$ is at least one of an aliphatic, cycloaliphatic or aromatic radical or an inertly substituted derivative of any one of these, X is a halide and n is less than or equal to 3, but greater than 0.

Preferably $R^{VI}$ is at least one of a $C_1$ to $C_8$ aliphatic radical, a $C_5$ to $C_7$ cycloaliphatic radical or a phenyl radical. More preferably $R^{VI}$ is at least one of an alkyl, aryl, arylalkyl, alkenyl or arylalkenyl radical or an inertly substituted derivative of any one of these. Most preferably $R^{VI}$ is at least one of an ethyl, isopropyl, sec-butyl, isobutyl, cyclohexyl, phenyl, benzyl, 1-octenyl and 1-phenyl-1-heptenyl radical.

Preferably X is at least one of chlorine, bromine and iodine. More preferably X is chlorine.

The most preferred cocatalysts include ethylaluminum dichloride, ethylaluminum sesquichloride and diethylaluminum chloride. Ethylaluminum dichloride is the most preferred cocatalyst.

Organometallic compounds are frequent cocatalysts in catalyst systems and their preparation is known to those skilled in the art. These catalysts are readily synthesized and many are commercially available.

Typically the transition metal complex catalyst and the organometallic compound cocatalyst are mixed in an inert diluent. The mole ratio of the organometallic compound cocatalyst to the transition metal complex catalyst is between approximately 1:1 and 300:1, preferably between approximately 3:1 and 50:1.

The Process

The polymerization of the monomers suitable for polyamide formation may be conducted under a broad range of process conditions which are generally known in the prior art. In the preferred practice of the invention, monomer or monomers are maintained at a temperature above their melting points but below the decomposition temperature of the products. It is generally preferred to conduct the process at a temperature between 100° and 300° C., and conducting the process between 135° and 200° C. is most preferred.

The temperature and amount of time required for polymerizaton are interrelated. At low temperatures it will take longer for a polymer to form than at high temperatures. In general, the reaction is conducted in less than 48 hours, with times ranging from 2 to 20 hours normally being adequate to produce the polyamide.

Although this polymerization can take place in an open container in contact with the atmosphere, it is preferred to carry out the polymerization in the absence of oxygen. This can be achieved by blanketing the reaction mixture with either an inert gas such as nitrogen or with a gaseous reactant necessary for polymerization, e.g. gaseous ammonia when polymerizing an alpha,beta-unsaturated carboxylic acid or steam when polymerizing an alpha,beta-unsaturated nitrile.

This reaction can proceed at atmospheric, superatmospheric or subatmospheric pressure. Normally, sufficient pressure is required to maintain the volatile ingredients in the liquid state under the polymerization conditions and to control the concentration of gaseous ingredients. Thus, the polymerization normally takes place under superatmospheric pressure. After polymerization has proceeded for a suitable time, the pressure can be lowered to pull off water and other volatiles. In processes employing the transition metal complex catalyst of this invention it has been discovered that pressure has little effect on the transition metal complex catalyst process for pressures between 1 and 100 atmospheres. Preferred pressure is atmospheric or slightly above.

Another important factor in the conduct of the polymerization is the extent to which the reactants are able to physically contact each other so that the desired reaction can occur. Various aromatic, aliphatic or halogenated hydrocarbon solvents and liquid dispersions are helpful in improving the contacting. Many of the transition metal complex catalysts and optional organometallic complex cocatalysts are soluble in such solvents. The catalyst dissolved in a solvent leads to the greatest efficiency of use of the catalytic metal species. It has also been found that ammonia and/or water can be added to improve the conversion of the monomers to high molecular weight polymer.

A catalytic amount sufficient to promote some polymer formation is required. Typically the mole ratio of monomer to catalyst is between 50:1 and $1 \times 10^6:1$.

This polymerization process can proceed by any of the generally known modes of polymerization including bulk, slurry, suspension or solution polymerization by batch, continuous or intermittant addition of the monomers and other components. The polyamides produced have a wide variety of applications. Generally, they may be used in any application calling for a nylon type polymer. For example, these polyamides can be used as fibers, plastics, films and molding resins.

The catalyst of this invention has several advantages for use in polyamide formation and specifically nylon-3 formation. These advantages include high yields of polyamides; very low levels of catalysts being required; structural control of the polymer molecule is achieved due to steric and electronic effects of the catalyst; increased molecular weight.

SPECIFIC EMBODIMENTS

In order to better illustrate the instant the following examples are provided:

Example I: Catalyst Synthesis

In the following catalyst synthesis cobalt chelates were prepared using a modification of the method described by H. Veening et al., *Gas Chromatography*, 1967, p. 248. In these examples, acetylacetonate is abbreviated "AcAc".

IA. Preparation of $Co(II)(F_3AcAc)_2$ 2.0 grams of Co(II) carbonate ($2Co(CO_3) \cdot 3(Co(OH)_2)$) was combined with 12.0 gms of trifluoroacetylacetonate. The system was stirred and heated to reflux under argon. After 30 minutes, the flask contained a reddish suspension with a light orange precipitate. The solid was recovered by filtration and dissolved in acetone to give a bright red solution. The acetone was roto-evaporated to yield an orange pink crystalline solid.

IB. Preparation of $Co(III)(F_3AcAc)_3$ 1.5 grams of $Co(II)(F_3AcAc)_2$ was recombined with the excess ligand from its synthesis and stirred. 2.0 ml of t-Butylhydroperoxide were added and the system slowly heated to reflux. This solution turned from a bright red to a dark green color. The solution was refluxed for a total of 2 hours, cooled, and roto-evaporated to a green pasty solid. This paste was washed with CCl4-heptane which resulted in the isolation of a light green solid.

IC. Preparation of Co(II)(F6AcAc)2

3.0 grams of the basic cobalt carbonate (2Co(CO3) . 3(Co(OH)2) was placed in a round bottom flask with 18 ml of hexafluoroacetylacetone. The system was heated to reflux with stirring. As the reaction proceeded 10 ml of addition F6AcAcH was added. After 2 hours, the system was cooled and the solid filtered. The solid was washed with ligroin and then extracted on the filter frit with acetone to form a dark red solution. The acetone was rotovapped with heating to give a liquid which upon slow cooling under vacuum gave a highly crystalline orange pink solid.

ID. Preparation of Co(III)(F6AcAc)3 2.0 grams of Co(II) (F6AcAc)2 was placed in a round bottom flask with 3.5 ml of F6AcAcH. The mixture was stirred and 0.5 ml of 90 percent H2O2 was added. [A safety shield, gloves and face shield were used for protection.] The system was stirred and slowly heated. Upon inital heating, a rapid exothermic reaction produced a dark green solution and solid. After 30 minutes of heating, a dark green solution was recovered.

The solution was mixed with 40 ml of CCl4 and heated to near boiling. This heating caused separation of the unreacted ligand and Co(II) into an oil which settled to the bottom of the beaker. The green solution was decanted/filtered and rotoevaporated. Long bright dark green crystals formed which were still "wet" with excess ligand. Washing of the crystals with CH3OH and air drying produced a "dry" green crystalline product.

Example II: Polymerization of Ammonium Acrylate

A 25 ml glass ampoule was charged with 4.0 g of ammonium acrylate and 1.0 mole percent catalyst. The ampoule was purged with argon and then flame sealed. The ampoules were heated at 175° C. for 16 hours and then allowed to cool. The cooled ampoules were opened and the contents dissolved using ultrasonic agitation in 15 ml of 95 percent formic acid. The contents were then filtered and coagulated in 400 ml of acetone, where a precipitate formed. The precipitated material was then filtered and vacuum dried at 45° C. for 16 hours. The product was determined to be nylon-3 by IR and NMR spectroscopy. Crystallinity was determined using X-ray diffraction. Intrinsic viscosity, which is an indication of the relative molecular weight of the polymers, was determined using 90 percent formic acid at 25° C. in an Ubelholde viscometer.

The results for several polymerizations are shown in Table I. Comparative polymerizations are designated by "C" before the run number.

TABLE I

| Run No. | Catalyst | Percent Crystallinity | Intrinsic Viscosity | Percent Conversion |
|---|---|---|---|---|
| C-1 | No catalyst | 27.8 | 0.26 | 81.2 |
| C-2 | Co(III)(AcAc)3 | 14.6 | 0.39 | 82.1 |
| 3 | Co(II)(F3AcAc)2 | 11.4 | 0.15 | 74.6 |
| 4 | Co(III)(F3AcAc)3 | 19.7 | 0.81 | 86.2 |
| 5 | Co(II)(F6AcAc)2 | 33.4 | 0.15 | 80.9 |
| 6 | Co(III)(F6AcAc)3 | 21.4 | 0.61 | 78.8 |

Several additional polymerizations were conducted using the same procedure of run numbers 1 through 6 with two differences. First, the glass ampoule was charged with only 2.0 grams of ammonium acrylate.

Second, ultrasonic agitation was not used in the formic acid recovery step. It has been discovered ultrasonic agitation decreases the intrinsic viscosity and crystallinity of the resulting polymer. The results for these additional polymerizations are shown in Table II.

TABLE II

| Run No. | Catalyst | Percent Crystallinity | Intrinsic Viscosity | Percent Conversion |
|---|---|---|---|---|
| C-7 | No catalyst | 47.0 | 0.54 | 74.0 |
| C-8 | Co(III)(AcAc)3 | 45.4 | 0.55 | 75.2 |
| 9 | Co(III)(F3AcAc)3 | 46.3 | 1.25 | 71.3 |
| 10 | Co(III)(F6AcAc)3 | 45.9 | 1.27 | 75.7 |

Although only a few embodiments of this invention have been specifically described above, many additions and modifications can be made without departing from the spirit and scope of the invention. These and all other modifications are intended to be included within the scope of this invention, which is to be limited only by the following claims.

The claimed invention is:

1. A process for producing a nylon type polyamide, containing a plurality of $$\begin{array}{c} \text{O} \quad \text{H} \\ \parallel \quad | \\ -\text{C}-\text{N}- \end{array}$$

amide groups as integral parts of the main polymer chain, comprising contacting at a temperature sufficient to cause polymerization, at least one polyamide forming reactant with a transition metal complex catalyst, wherein the catalyst comprises at least one transition metal attached to a ligand containing electron withdrawing substituents wherein the electron withdrawing substituents are selected from the group consisting of —F, —Cl, —Br, —I, —CF3,

—CN, —NH3+, —NO2, and —NR3+ where R is an alkyl or an aryl radical.

2. The process of claim 1, where the transition metal in the catalyst is selected from the group consisting of cobalt, molybdenum, nickel, copper, iron, manganese, ruthenium, chromium, vanadium and rhodium.

3. The process of claim 2, where the transition metal in the catalyst is selected from the group consisting of cobalt, molybdenum, nickel and copper.

4. The process of claim 1, where the valence state of the transition metal in the catalyst is greater than or equal to +2.

5. The process of claim 1, where the ligand is organic and has a net negative or neutral charge.

6. The process of claim 1, where the electron withdrawing substituents attached to the ligand have a positive Hammet coefficient.

7. The process of claim 1, where the ligand is organic and has a net negative or neutral charge.

8. The process of claim 6, where the organic ligand includes oxygen, nitrogen, sulfur, phosphorus, arsenic or mixtures thereof.

9. The process of claim 8, where the ligand is selected from the group consisting of

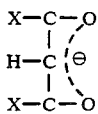 (a)

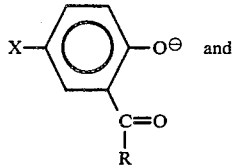 and (b)

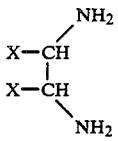 (c)

where X is an electron withdrawing substituent and R is an alkyl or aryl group.

10. The process of claim 1 where the transition metal complex catalyst is selected from the group of consisting of cobalt (II) trifluoroacetylacetonate, cobalt (III) trifluoroacetylacetonate, cobalt (II) hexafluoroacetylacetonate and cobalt (III) hexafluoroacetylacetonate.

11. The process of claim 1, where the transition metal complex catalyst is employed in conjunction with a cocatalyst selected from the group consisting of:
(a) di-sec-butylmagnesium;
(b) n-butylmagnesium chloride;
(c) aluminum triethyl and
(d) compounds of the formula:

$$(R^{VI})_n AlX_{(3-n)}$$

where
$R^{VI}$ is at least one of an aliphatic, cycloaliphatic or aromatic radical of 1 to 8 carbon atoms,
X is halide and
n is less than or equal to 3 but greater than 0.

12. The process of claim 11, where $R^{VI}$, in the cocatalyst of the formula $(R^{VI})_n AlX_{(3-n)}$, is at least one of an alkyl, aryl, arylalkyl, alkenyl, or arylalkenyl radical.

13. The process of claim 12, where $R^{VI}$ is at least one of an ethyl, isopropyl, sec-butyl, isobutyl, cyclohexyl, phenyl, benzyl, 1-octenyl or 1-phenyl-1-heptenyl radical.

14. The process of claim 11, where X, in the cocatalyst of the formula $(R^{IV})_n AlX_{(3-n)}$, is at least one of chlorine, bromine or iodine.

15. The process of claim 14, where X is chlorine.

16. The process of claim 11, where the cocatalyst of the formula $(R^{VI})_n AlX_{(3-n)}$ is at least one of ethylaluminum dichloride, ethylaluminum sesquichloride or diethylaluminum chloride.

17. The process of claim 11 where the mole ratio of the cocatalyst to the transition metal complex catalyst is between approximately 1:1 and 300:1.

18. The process of claim 11 where the ratio of the organometallic compound cocatalyst to the transition metal complex catalyst is between approximately 3:1 and 50:1.

19. The process of claim 1, where the polyamide forming reactant is at least one of (1) an alpha, beta-unsaturated carboxylic acid and ammonia or (2) an ammonium salt of an alpha, beta-unsaturated carboxylic acid.

20. The process of claim 19 where the alpha,beta-carboxylic acid is of the formula

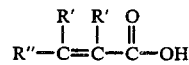

where each R' is independently one of hydrogen, $C_1$ to $C_4$ alkyl group or a halogen and R" is one of hydrogen or a $C_1$ to $C_{10}$ alkyl group.

21. The process of claim 20 where the alpha,beta-carboxylic acid is at least one of acrylic acid or crotonic acid.

22. The process of claim 19 where the ammonium salt of the alpha,beta-unsaturated carboxylic acid is of the formula:

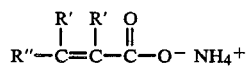

where each R' is independently one of hydrogen, $C_1$ to $C_4$ alkyl or a halogen and R" is one of hydrogen of a $C_1$ to $C_{10}$ alkyl group.

23. The process of claim 22 where the ammonium salt of the alpha,beta-unsaturated carboxylic acid contains between 3 and 7 carbon atoms.

24. The process of claim 23 where the ammonium salt of the alpha,beta-unsaturated carboxylic acid is at least one of ammonium acrylate or ammonium methacrylate.

25. The process of claim 1, where the temperature sufficient to cause polymerization is between 100° C. and 300° C.

* * * * *